W. L. Williams,

Splitting Wood,

№ 2,132, Reissued Dec. 19, 1865.

AM. PHOTO-LITHO. CO. N.Y. (OSBORNE'S PROCESS)

UNITED STATES PATENT OFFICE.

WILLIAM L. WILLIAMS, OF NEW YORK, N. Y.

IMPROVEMENT IN MACHINES FOR SPLITTING WOOD.

Specification forming part of Letters Patent No. 17,061, dated April 14, 1857; Reissue No. 2,132, dated December 19, 1865.

*To all whom it may concern:*

Be it known that I, WILLIAM L. WILLIAMS, of the city, county, and State of New York, have invented certain new and useful Improvements in Machines for Splitting Fire-Wood; and I do hereby declare that the following is a full, clear, and exact description of the same, reference being had to the annexed drawings, making a part of this specification, in which—

Figure 2:
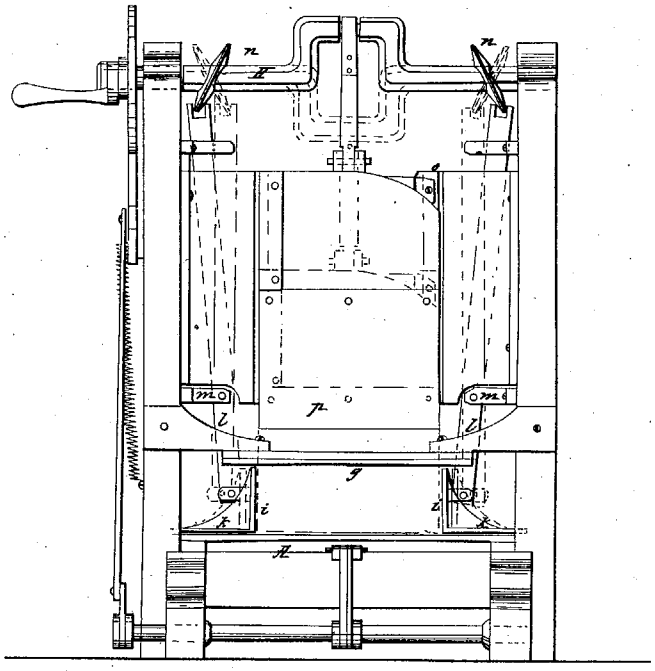
Figure 1:
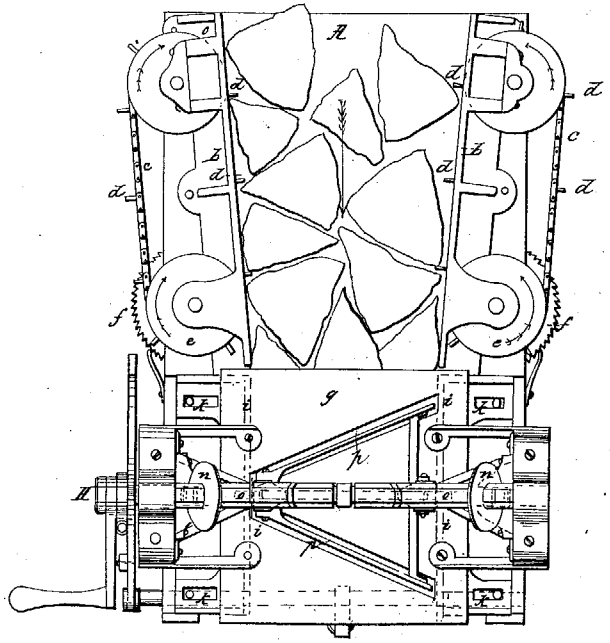

Figure 1 is a top view or plan, and Fig. 2 is a front elevation.

Similar letters indicate the same parts throughout.

Machines for splitting fire-wood differ from machinery for splitting wood generally (such as for riving shingles and for making match-splints) in this particular, that while in those the "bolts" or blocks of wood to be split are fed in singly, and are usually of uniform size as well as of regular form, the sticks of fire-wood are very irregular in shape, being uniform in length only, and these are brought to the action of the knives sometimes singly, where the sticks are large, but often several small ones are split at the same time while standing side by side, though not in actual contact, unless accidentally. The chief requisite of these machines is rapidity of working, for uniformity in the size of the pieces delivered is not at all necessary, (as in shingle and splint splitting.) Besides this, in match and shingle machines the wood is usually split at right angles to the direction to which it is fed along, whereas in machines for splitting fire-wood the knives stand diagonally to the direction of the feed, so as to split the wood in two directions, and this causes the wood to press out laterally or at right angles to the said feed. It is also necessary that fire-wood machines be protected against accidents, whereby the durability of the parts and continuity of action may be secured.

In the fire-wood machines which feed horizontally there are some defects which my improvements are intended especially to obviate, and, first, that the feed being necessarily intermitted, the sticks are liable to be thrown down by the sudden starting and stopping. When this occurs under the knife, the attendant cannot correct it, and the edge of the knife may either be broken out by striking upon the side of the grain, or some other part give way in consequence of the great resistance. In those which effect the feed by means of an endless revolving floor this is especially liable to occur, for the reason that the impulse must be given to the sticks at bottom, thus often throwing over the smaller ones, particularly when attempting to work rapidly. A second defect is in the manner of supporting the sticks laterally while exposed to the immediate action of the knives, for the tendency is to expand the mass of wood laterally as the knife passes down, and since to split the wood in different directions the knives stand at an angle more or less acute with reference to the sides of the floor, the triangular mass of wood inclosed must be forced against those sides; hence the machine must be fitted so as not to prevent such expansion. I am well aware that to some extent in shingle-machines an expansion has been allowed by making the vertical ends yielding by the action of springs upon the wood, so that it could extend and would be closed up again as the knives were withdrawn. This arrangement, however, was not adapted to machines for splitting fire-wood with diagonal knives. A third defect is found in the arrangement and position of the cross-knives with reference to each other. As usually constructed, the splitting-tool consists of one knife extending across the floor at an angle of forty-five degrees with the sides thereof, and having another knife made in two parts, one of which is placed midway on each side of it and at right angles to it, forming an X shape. In the angles of these the wood becomes crowded by the entrance of the knives, so that they are often bent, particularly when there is a knot in that portion of wood which is in one of the angles.

My invention consists, first, in so feeding the sticks up to the action of the knives that while being so fed they shall be caused automatically to assume the position of close contact with each other, and to fill the space between the side pieces, whereby, becoming a close mass, none of the pieces can fall over except those at the front of the machine, and which, having been split to proper size, are then ready to be delivered off the floor.

A second feature consists in supporting the sticks laterally while under the knives by means of yielding supports or side pieces, so arranged with reference to the knives that as those descend into the wood the said supports will yield sufficiently to allow for the lateral expansion of the mass as the diagonal knives enter, and said wood will be brought up again into place as the knives are withdrawn, thereby providing a lateral movement that will support the wood and prevent the diagonal knives causing the wood included between them binding against the side of the feeding-floor.

A third feature lies in so arranging the knives in their relation to each other that although they stand at an angle to they do not cross nor come in contact with each other, whereby, instead of the usual four angles being formed into which the wood can be crowded, mine has but one, and at that one the knives can be placed from this construction so far apart that they will not both operate upon the same piece of wood at the same time. This, though of but little importance in splitting soft and clear woods, is of great consequence when operating on the harder woods, such as hickory or oak.

The construction may be as follows: Upon a suitable frame or foundation is laid a smooth and oblong floor, A, a top view of which is given in Fig. 1. At each side of this and extending along the floor nearly to the splitting-tool is a rail or side piece, *b*, elevated about six inches above the floor. These rails are not necessarily parallel to each other, but may stand at a small angle, being opened out at the end of the floor farthest from the knives, as shown. Between the edge of this rail and the floor, on each side, an endless chain, *c*, travels, passing over pulleys at each end of the rails, and upon the links of each of said chains is a series of projecting prongs, *d*, at intervals, as seen. Two of the pulleys *e* are made to turn by ratchet-wheels *f* affixed to the shaft of each below the stationary floor, and these ratchet-wheels are moved by pawls, with an intermitted motion derived from a cam on the main shaft H, causing the chains to progress in the direction of the arrows on the pulleys, said motion being timed to take place when the knives are out of the wood. Upon that portion of the floor toward which the feed moves the splitting is effected, and here is a plate, *g*, supported from above at a height from the floor which will permit the sticks of wood to pass under readily, and having suitable slots for the knives to play through. Between this plate and the floor there is on each side a movable piece, *i*, set parallel to each other, and so placed upon guides K that said pieces may be made to approach or recede from each other slightly. The limits of motion to these will be that they do not approach to make a narrower passage than is afforded at the inner ends of the rails *b*, and they must be capable of moving back to such distance as will allow for the expansion of the wood fed between them, caused by the displacement of the splitting-knives when those shall have been driven in to the full depth. To effect the motions of these pieces upon their guides by a positive mechanism, I provide a lever, *l*, attached to each, and extending up nearly to the main shaft H, and having a fulcrum upon the main frame, as at *m*. The upper end of each lever is forked, and over it, upon the main shaft a disk, *n*, is set diagonally, as shown, whereby a vibrating motion is imparted to the levers by the rotation of the shaft, thus causing the side pieces, *i*, to approach and recede from each other, the disks being so set with reference to the crank that the side pieces shall be at their greatest distance from each other when the knives are at the lowest part of their throw.

The splitting-tool consists of two knives set at an angle to each other of forty-five degrees or less, and extending across the floor between the movable side pieces, forming in top view a V-shape, as seen at *p*, Fig. 1. These knives are fastened to a cross-head playing on suitable guides, *o*, on the main frame, and actuated by a crank on the shaft, in the usual manner. The cutting parts of the knives are not in contact with each other even at the sides, where they approach nearest, and at this side they should properly be set (particularly as before remarked for hard woods) at such distance apart that the knife which gives the second cut will act at that end upon a piece of wood, which is not at the same time acted upon by the other knife, a distance apart equal to the amount of a single feed will generally be sufficient.

The operation will be as follows: Rotary motion being given to the main shaft, the splitting-tool will be made to rise and fall in the usual manner, and by the action of the pawls upon the ratchet-wheels, the feeding-chains will also be made to move along in order to effect a feed, which, as before remarked, is to take place while the splitting-tool is at its highest throw. The sticks of wood having previously been cut to nearly uniform length, the attendants place them on end upon that part of the floor farthest from the splitting-tool, and they are fed up from that place by the onward motion of the projecting prongs on the chain. These prongs, however, would merely act to cause each separate stick to turn a little out of the way and be pushed toward the center were it not that the sticks stand thickly all over the floor, and thus are compressed together, so that motion given to those along the sides by the action of the prongs carries the whole along in a body, and the sticks become, before progressing far, worked into the close order required, so that when under the knives the vertical position of the pieces may be preserved, particularly of those which having passed the first knife have received a cut in one direction. With some care on the part of the attendants in placing the sticks, this compacting of the mass would be effected even if the rails *b* were parallel, but since economy of working requires that considerable speed should be given, the attendants are not able when feeding rapidly to set the sticks as closely as would be necessary to bring them into a dense mass by the time the knives are reached. The desired compactness is, however, still obtained under these circumstances by the narrowing of the floor, which necessarily brings the sticks closer together as they are carried onward. As the splitting-tool enters, the mass is, of course, somewhat extended in all directions. That expansion which takes place toward the feeding-floor is sustained by the sticks which are advancing. None can fall over toward the front until they have passed the second knife. The yielding pieces *i i* stand at the sides, and when the tool is out of the wood they are just at the width of the mass as it came through from feeding-chains. As the knives now descend, these sides yield or are made to retire by the positive action of the disks *n* through the levers *l*, thereby preventing the wood becoming jammed between the diagonal knives and the sides of the feeding-trough, and when the knives rise the side pieces are returned to place and keep the wood from falling over.

If set at an angle of forty-five degrees to the feeding-trough, the knives cut the sticks into rectangular form; but if at any less angle they are delivered in rhomboidal shape; and for kindling this is preferable, since being thin at the acute angles, the wood takes fire more readily.

It may be remarked that the rails *b* are not absolutely necessary to the working of the feed, since if the chains are supported against rollers, or move upon a plate, so that they will not yield to pressure, the action will be equivalent to that of the fixed rails described.

What I claim, and desire to secure by Letters Patent, is—

1. The combination of the feeding-chains, arranged as set forth, with the stationary conveying-floor, for effecting the feeding up of the sticks in a fire-wood-splitting-machine, substantially as described herein.

2. In a machine for splitting fire-wood, the combination of a yielding lateral support to the wood with diagonal knives, substantially as set forth, whereby the wood confined between said knives is allowed to move laterally as the knives enter the same, for the purposes set forth.

3. Communicating to said yielding lateral supports a positive motion governed by the movement of the knives, substantially as and for the purposes specified.

4. In a wood-splitting machine, two separate knives at an angle or diagonally to each other and each extending across the feeding-floor, so as to split up the wood in the manner specified.

In witness whereof I have hereunto set my signature this 11th day of October, A. D. 1865.

WM. L. WILLIAMS.

Witnesses:

THOS. GEO. HAROLD,
CHAS. H. SMITH.